United States Patent
Paradiso

(10) Patent No.: US 9,822,954 B2
(45) Date of Patent: Nov. 21, 2017

(54) CLAMP WITH EXTERNAL SUPPORT

(71) Applicant: Thomas Paradiso, Sparta, NJ (US)

(72) Inventor: Thomas Paradiso, Sparta, NJ (US)

( * ) Notice: Subject to any disclaimer, the term of this patent is extended or adjusted under 35 U.S.C. 154(b) by 0 days.

(21) Appl. No.: 15/469,505

(22) Filed: Mar. 25, 2017

(65) Prior Publication Data
US 2017/0248293 A1    Aug. 31, 2017

Related U.S. Application Data

(62) Division of application No. 14/508,711, filed on Oct. 7, 2014, now Pat. No. 9,638,402.

(60) Provisional application No. 61/908,818, filed on Nov. 26, 2013.

(51) Int. Cl.
| | |
|---|---|
| *F16B 2/10* | (2006.01) |
| *F16B 7/04* | (2006.01) |
| *F16M 13/02* | (2006.01) |
| *F21V 21/08* | (2006.01) |
| *F21V 21/088* | (2006.01) |
| *F21V 33/00* | (2006.01) |
| *F16B 35/00* | (2006.01) |

(52) U.S. Cl.
CPC ............ *F21V 21/088* (2013.01); *F16B 2/10* (2013.01); *F16B 7/0486* (2013.01); *F16B 35/005* (2013.01); *F16M 13/022* (2013.01); *F21V 33/006* (2013.01)

(58) Field of Classification Search
CPC .. F21V 21/088; F21V 21/0885; F21V 33/006; F16M 13/022; F16B 7/0486; F16B 7/0493; F16B 35/005; F21W 131/109
USPC ......... 248/219.2, 219.3, 523, 534, 535, 540, 248/229.1, 229.13, 229.23, 230.4, 316.1, 248/314, 74.3; 256/54, 68, 69, 152; 362/382, 418, 431, 432; 403/385, 400
See application file for complete search history.

(56) References Cited

U.S. PATENT DOCUMENTS

| | | | | |
|---|---|---|---|---|
| 4,391,458 A | * | 7/1983 | Blakeley | F16L 23/08 285/112 |
| 4,566,819 A | * | 1/1986 | Johnston | E04G 7/14 403/385 |
| 4,960,546 A | * | 10/1990 | Tharp | B01F 3/0412 261/122.1 |
| 5,305,978 A | | 4/1994 | Current | |
| 5,437,138 A | * | 8/1995 | Tuohey | E04D 13/064 248/48.2 |
| 6,490,823 B1 | | 12/2002 | Ibarra | |
| 7,300,172 B1 | | 11/2007 | Lefler | |
| 7,740,220 B2 | * | 6/2010 | Jeanveau | A45B 11/00 248/534 |

(Continued)

OTHER PUBLICATIONS

USPTO, Office Action dated May 31, 2017 for U.S. Appl. No. 15/470,812, for copending patent application.

*Primary Examiner* — Tan Le
(74) *Attorney, Agent, or Firm* — Benjamin Applebaum

(57) ABSTRACT

The present disclosure describes a clamp used for adherence and securement to a desired object. The clamp has an upper half and a lower half held together by hinges. Opposite the hinges there is a locking mechanism which can be loosened or tightened as necessary. The clamp further has a shaped support designed to support a number of objects including solar lights, flags, poles, signs, rods, and the like. The clamp is designed to fit on existing colonial style and chain link fence structures, however, the clamp can be sized appropriately for the specific need.

10 Claims, 7 Drawing Sheets

(56) References Cited

U.S. PATENT DOCUMENTS

| | | |
|---|---|---|
| 8,172,277 B2 | 5/2012 | Sarkisyan |
| 9,151,478 B2 | 10/2015 | Noonan |
| 9,638,402 B2 * | 5/2017 | Paradiso ............... F21V 21/088 |
| 2008/0080174 A1 | 4/2008 | Xu |

* cited by examiner

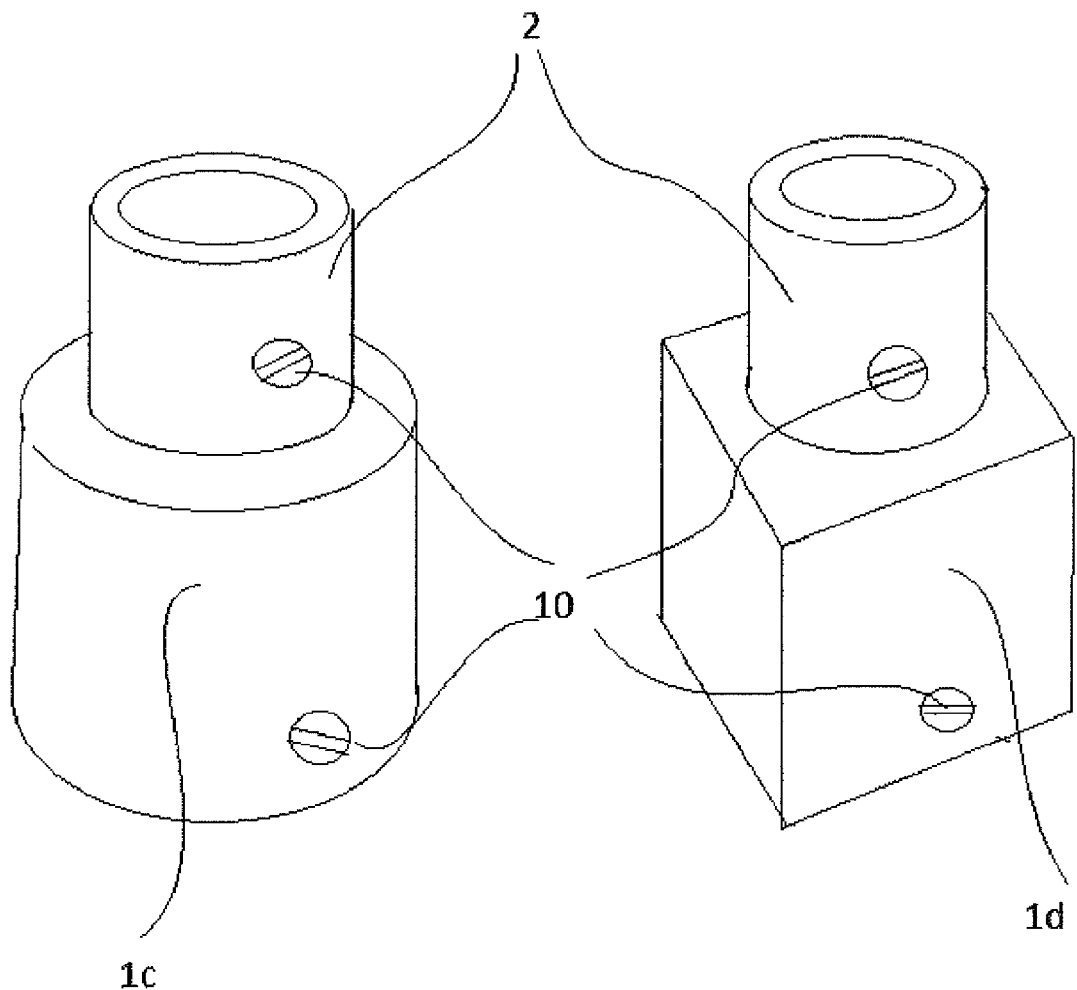

CLAMP WITH EXTERNAL SUPPORT

CLAIM OF PRIORITY

This application is a utility patent application and is a divisional application of U.S. patent application Ser. No. 14/508,711, filed 7 Oct. 2014, which claims the benefit of U.S. Patent Application Ser. No. 61/908,818, filed 26 Nov. 2013, the contents of which are incorporated by reference herein.

FIELD OF THE INVENTION

The field of the invention relates to mechanisms that adhere to structures and support external components, namely a clamp with an integrated support. In particular, to a clamp that is designated to secure to polygonal structures and support a solar lamp amongst other apparatus.

BACKGROUND OF THE INVENTION

Clamps are devices typically comprising at least one moving part. The pieces of a clamp come together to join, secure or impede the movement of separate objects through the use of inward pressure. Clamps have a wide range of uses stemming from home, commercial, and industrial applications. In addition, clamps can be permanent or temporary depending on the location and desired usage of the clamp. While clamps have a number of practical uses, there lack clamps for some specialty purposes. Additionally some clamps can be cumbersome or expensive due to the materials required or technical nature of the clamps, Thus, there is a need for a lightweight, portable, and cost effective clamp that can serve a variety of purposes.

REVIEW OF RELATED TECHNOLOGY

U.S. Pat. No. 8,172,277 teaches a pipe coupling device for joining two pipe segments including a cylindrically shaped gasket for receiving the pipe segments and a cylindrically shaped clamp having a first and second semi-cylindrical segment attached by a hinge that extends along a length of one side each segment parallel to the axis of the cylinder. The clamp includes an inner wall having at least one groove forming a channel aligned in each of the semi-cylindrical segment and extending about the circumference of the inner wall of the clamp. A second side of the semi-cylindrical segment includes flanges that extend radially away from the segments. The flanges include complementary apertures and bolts that are received through the apertures for sealing the flanges together. The semi-cylindrical segments are movable about the hinge between an open position and a closed position, wherein the pipe segments are received in opposing ends of the gasket and the clamp is open to receive the pipe segments a gasket combination and the closed about the gasket pipes and secured about the gasket for a sealing engagement by the bolts.

U.S. Pat. No. 7,300,172 teaches an illuminable attachment for a tube having a clamp movable from an open position to a closed position engaging the walls of said tube. The illuminable element is comprised of a housing having a lamp, power supply, switch and circuit means within said housing mountable by said clamp to a tube.

U.S. Pat. No. 5,305,978 teaches a clamp useful as part of a sign holder which displays identifying characteristics of merchandise on a display rack support rod of circular cross-section. The clamp has an upper housing and a lower housing hingably connected together. The free ends of the housing engage each other as they are overlapped one over the other. When the upper and the lower housings overlap, teeth on each are resiliently urged toward each other to engage each other to releasably lock the housing into any desired one of a plurality rod encircling positions. Friction pads are urged by the upper and lower housing against the rod. The pads compress in response to increasing the amount of overlap by relative movement of the upper and the lower housing. The clamp completely encircles the rod.

U.S. Patent Application 2008/0080174 teaches a solar light for a fence post, comprising: a connecting element, which is designed to be mounted on the top end of the fence post, a LED lamp, fixed on the top of the connecting element, a solar panel, affixed to the outer wall of the connecting element, a rechargeable battery in electric communication with the LED lamp, and charged by the solar panel. The solar light fixes the solar panel from the outer wall of the connecting element, which is simple in structure, enables the light running upwards to get through the top of the light body, and does not restrict the figuration of the lamp chimney, in this case, the lamp chimney could be in a more good-looking shape.

Various devices are known in that art. However, their structure and means of operation are substandially different from the present disclosure. The other inventions fail to solve all the problems taught by the present disclosure. At least one embodiment of this invention is presented in the drawings below and will be described in more detail herein.

SUMMARY OF THE INVENTION

The present disclosure described and teaches an apparatus having an upper half having a polygonal shape and a lower half having a substandially similar polygonal shape, between which is a defined shape to accommodate a polygonal object extending therethrough; at least one hinge connecting the upper half and the lower half; a locking mechanism on an opposite side of the clamp body from the hinge, wherein the locking mechanism secures the upper half to the lower half; and a attachment mechanism affixed to the upper half having a height and a perimeter with a recessed interior.

The upper half and lower half can be a number of different shapes having anywhere from zero to about ten lateral edges. This enables the apparatus to be secured to most any object without worry that the apparatus will not hold. The apparatus can comprise a number of materials including plastics, metals, resins, or composites. The specific material comprising the apparatus may be picked to best suit the purpose or environment of the apparatus. The upper half and the lower half are preferably held together using two hinges, although other embodiments are envisioned where there are more or fewer hinges. Opposite the hinges, is the locking mechanism used to secure the apparatus to the desired object, preferably a fence. Since fences and their supports are typically circular or square in nature, the apparatus typically comprises these shapes. However, other shapes may exist depending the object the apparatus is to be secured. The locking mechanism is a tab and thumb screw, although may comprise a number of different mechanisms including slidable locks, clips, latches, hooks, levers, and the like. The apparatus may further comprise an adapter that fits within the attachment mechanism. This changes the diameter of the support enabling a number of different items to be effectively held by the support.

In another aspect of the invention there is a lighting system having a solar light with a length of support extending therefrom; and a clamp with an upper half having a polygonal shape and a lower half having a substantially similar polygonal shape, between which is a defined shape to accommodate a polygonal object extending therethrough, at least one hinge connecting the upper half and the lower half, a locking mechanism on an opposite side of the clamp body from the hinge, wherein the locking mechanism secures the upper half to the lower half, an attachment mechanism affixed to the upper half having a height and a perimeter with a recessed interior wherein, the support of the solar light engages the attachment mechanism.

The upper half and the lower half of the clamp can be substandially semi-circular or substandially U-shaped. Additionally, the clamp can provide greater flexibility through the hinge. The hinge(s) can expand and are positionable independent of one another. Thus, the clamp can fit different sized objects of the substantial general shape of the clamp. The hinges can provide for vertical as well as lateral movement of the upper half relative to the lower half. Additionally, the solar light is removable. The attachment mechanism may have an adapter that fits within changing the diameter of the support. This enables objects of differing sizes to be placed in and effectively held by the support.

In general, the present invention succeeds in conferring the following, and others not mentioned, benefits and objectives.

It is an object of the present invention to provide an apparatus that is lightweight and portable.

It is an object of the present invention to provide an apparatus that can be easily employed in a short amount of time.

It is an object of the present invention to provide an apparatus that is suited for securement to a colonial-style fence.

It is an object of the present invention to provide an apparatus that is suited for securement to a standard chain link fence.

It is an object of the present invention to provide an apparatus that is strong and durable.

It is an object of the present invention to provide an apparatus that can be secured to a variety of objects.

It is an object of the present invention to provide an apparatus that support a variety of objects.

It is an object of the present invention to provide a lighting system that can be readily secured to a variety of objects including fences, and more specifically chain link and colonial style fences.

It is an object of the present invention to provide an apparatus that can be secured on top of a colonial style fence with rectangular post.

It is an object of the present invention to provide an apparatus that can be secured on top of a round post or pole.

It is an object of the present invention to provide an apparatus that can be adapted to various conditions providing an offset device for variable installations.

BRIEF DESCRIPTION OF THE DRAWINGS

FIG. 7 is an overview of an embodiment designed to be mounted on top of a round fence.

FIG. 8 is an overview of an alternate embodiment designed to be mounted over square or rectangular top of the fence.

DETAILED DESCRIPTION OF THE DRAWINGS

Figure 1:
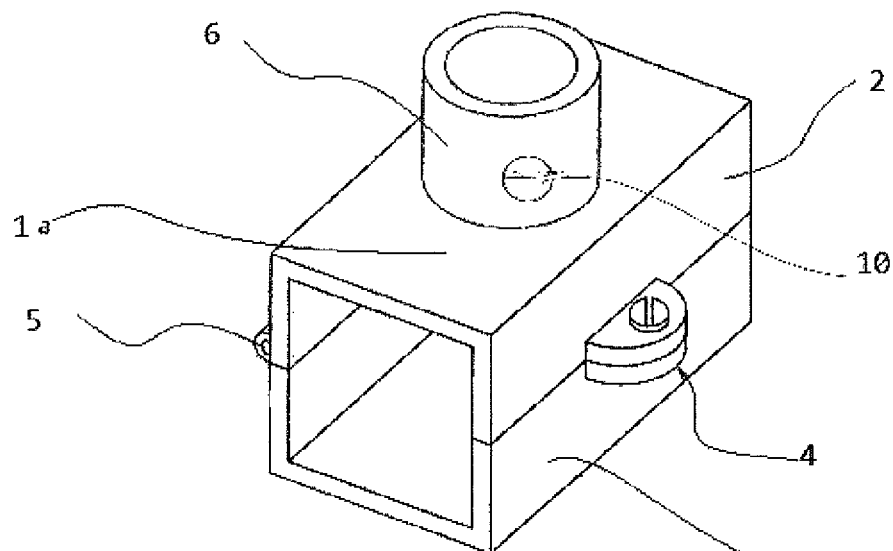
FIG. 1 is a perspective front view of a preferred embodiment of the present invention.

The preferred embodiments of the present invention will now be described with reference to the drawings. Identical elements in the various figures are identified, as far as possible, with the same reference numerals. Reference will now be made in detail to embodiments of the present invention. Such embodiments are provided by way of explanation of the present invention, which is not is not intended to be limited thereto. In fact, those of ordinary skill in the art may appreciate upon reading the present specification and view the present drawings that various modifications and variations can be made thereto without deviating from the innovative concepts of the invention.

Referring to FIG. 1, there is a perspective view of a preferred embodiment of the present invention. FIG. 1 shows a clamp 1a with an upper half 2 and a lower half 3. The upper half 2 and lower half 3 are substantially U-shaped, which together forms a substantially square clamp 1a. The two halves are held together by at least one, and preferably two, hinges 5. Opposite the hinges 5 is a locking mechanism 4. The locking mechanism 4 is a tab and screw mechanism that, when tightened, applies inward pressure securing the clamp 1a. Disposed on the upper half 2 is an attachment mechanism 6 having a perimeter and a height. The attachment mechanism 6 is formed to accept a number of different objects and most preferably a solar light. The light is locking by set screw 10.

Figure 2:
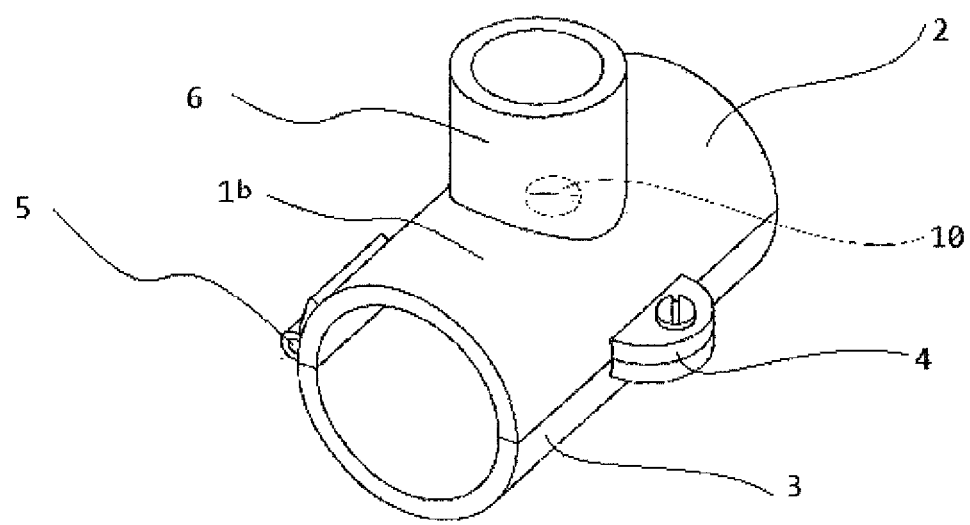
FIG. 2 is a perspective front view of an alternate embodiment of the present invention.

In FIG. 2. there is an alternate clamp 1b design. The upper half 2 and the lower half 3 are substantially semi-circular in shape which forms a substantially circular clamp 1b. Attached to one side of the clamp 1b, are hinges 5 that allow the upper half 2 and lower half 3 to move independent of one another and to open the clamp 1b. Opposite the hinges 5 is a locking mechanism. The locking mechanism 4 secures the clamp 1b once closed thereby preventing slippage or movement of the clamp 1b. The clamp additionally has an attachment mechanism 6 for supporting a number of objects. Objects are locked in position by set screw 10.

Figure 3:
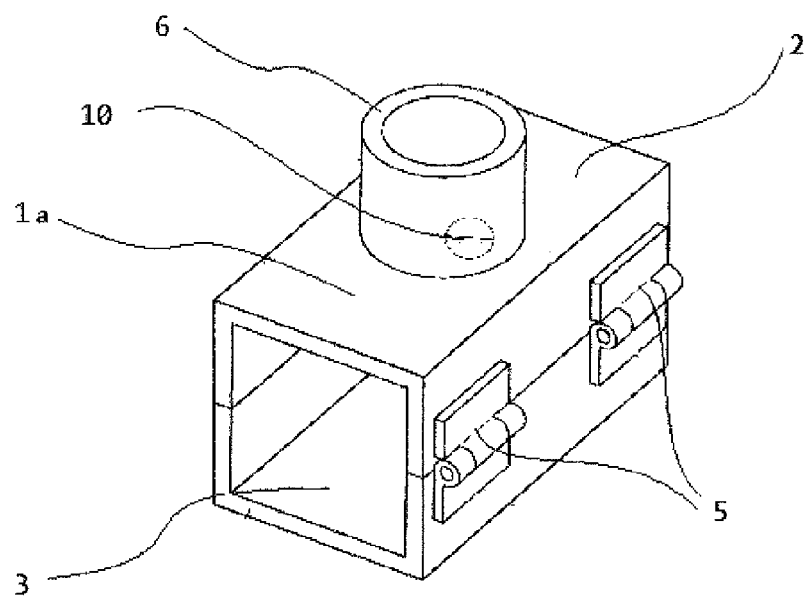
FIG. 3 is a perspective rear view of the preferred embodiment of the present invention.

In FIG. 3. there is a rear perspective view of the preferred clamp 1a.

Figures 4A, 4B:
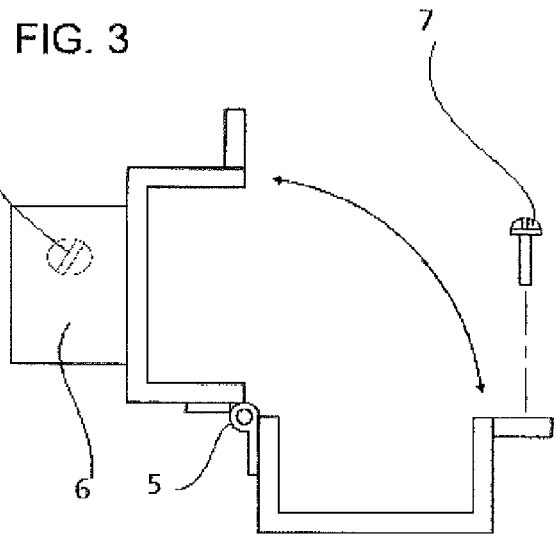
FIG. 4A is a side view of the preferred embodiment of the present invention when closed and secured.
FIG. 4B is a side view of the preferred embodiment of the present invention in an open position.

FIGS. 4A and 4B are side views of the clamp 1a in either an open or closed position. The hinges 5 facilitate the movement of the upper half 2 and the lower half 3. When in a closed position, the clamp 1a can be tightened with the screw 7 to ensure the clamp 1a remains secured to the desired object. In order to open or loosen the clamp 1a, the screw 7 is loosened and the upper half 2 or lower half 3 is moved out of position and the clamp 1a is removed.

Figure 5:
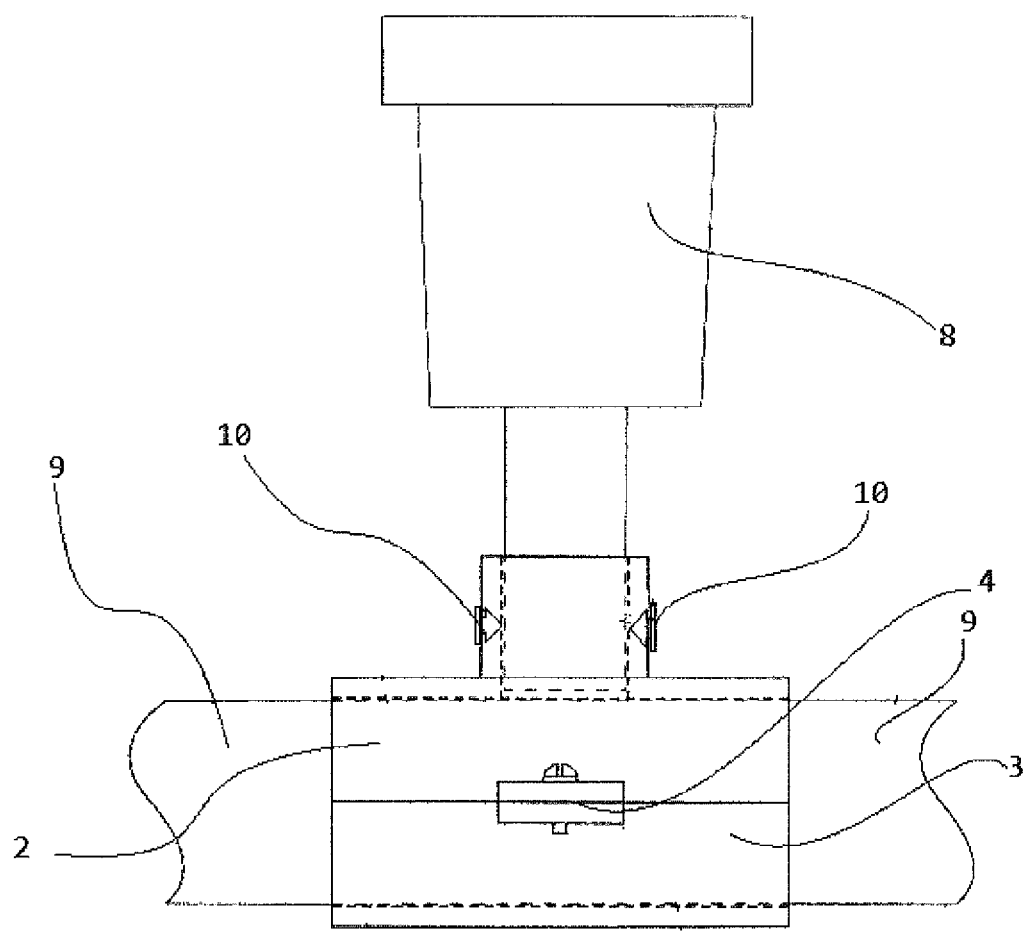
FIG. 5 is a front view of the preferred embodiment secured to a fence and supporting light apparatus.

The FIG. 5 shows a clamp 1a secured to a fence 9 with a solar light 8 in the attachment mechanism 6. The upper half 2 and the lower half 3 are placed around the fence 9 and the screw 7 is tightened. A solar light 8 engages the recess in the attachment mechanism 6 and secure the light.

Figure 6:
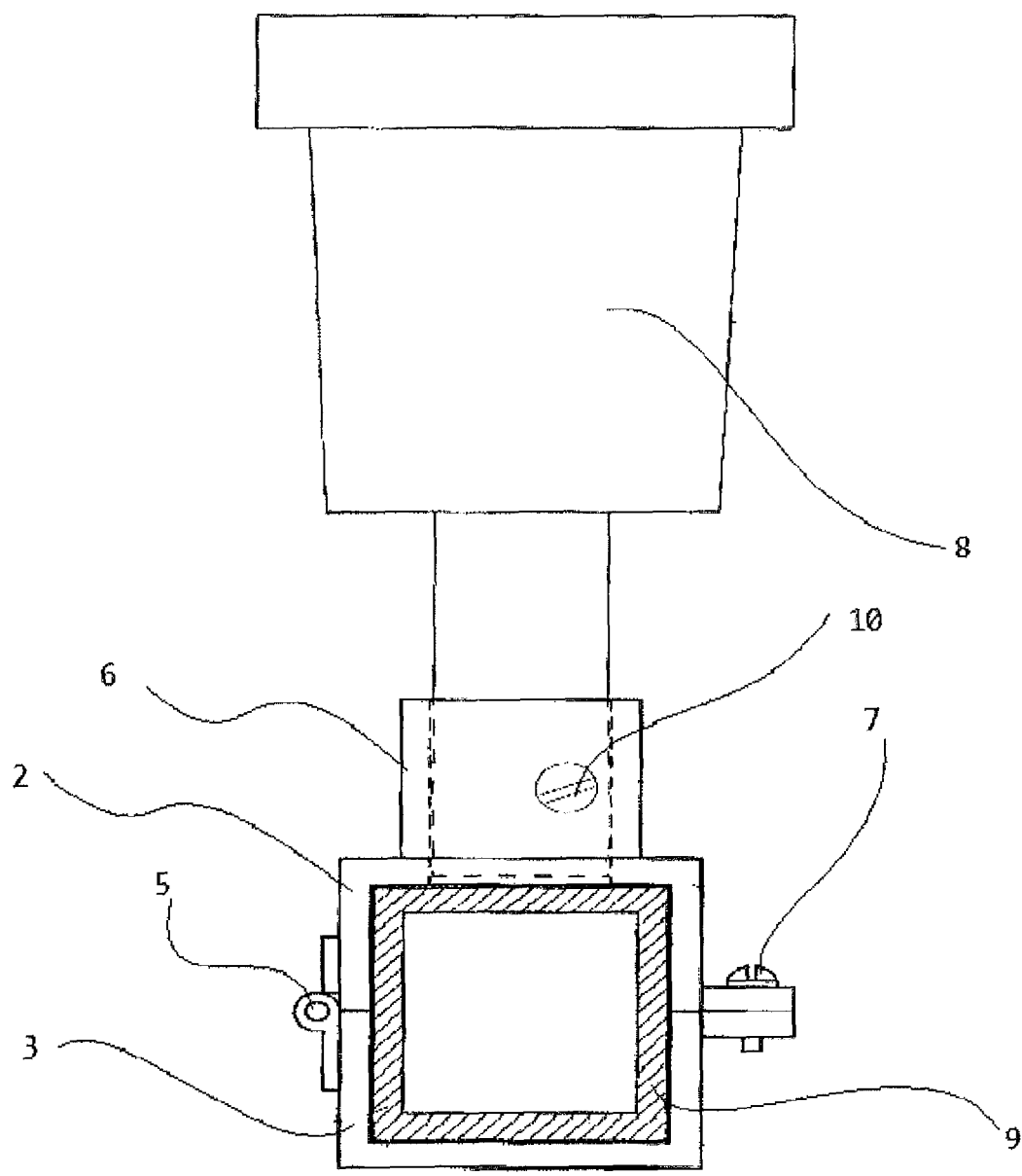
FIG. 6 is a side view of the preferred embodiment secured to a fence and supporting light apparatus.

FIG. 6 shows this interaction in more detail. Here, there is a side view of the clamp 1a as secured to a fence 9. The fence 9 and the upper half 2 and lower half 3 form substandially the same shape. This creates a proper fit that prevents the clamp 1a from slipping or otherwise becoming compromised.

The clamp 1a as shown in FIG. 1-6 can comprise a variety of material including plastic, metals, resins, and composites. The materials, more specifically may include but are not limited to plastic, rubber, foam, silicone, ABS (Acrylonitrile Butadiene Styrene), Polycarbonate, PVC (Polyvinylcarbonate), Polystyrene, ABS/PVC, PVC/Acrylic, Polysulfone, Acrylic, Polyethylene, PETG (Polyethylene terephthalate); wood; metals, including but not limited to iron, stainless steel, tin, aluminum, cooper; rubber including but limited to natural rubber, SBR (Styrene Butadiene Rubber), Isoprene rubber, Butadiene rubber, and chloroprene rubber, or any combination or composites of these materials or other materials and new materials that may be developed or manufactured in future. The exact composition of the clamp 1a,b,c,d should be determined by the support requirements as well as the environmental conditions on where the clamps are placed.

The clamp 1a,b,c,d can also be made in variety of sizes depending on the situations needs. The clamp 1a should be about 5 cm (2 inches) to about 45 cm (18 inches) and preferably be about 7.5 cm (3 inches) in length. The inner diameter of the clamp 1a should about 1 cm (0.5 inch) to about 10 cm (4 inches) and preferably be about 5 cm (2 inches) and more preferably 3 cm (1.25 inches). The clamp 1a is particularly shaped to fit on either standard chain link fences or colonial style fencing. The inner diameter of the circular style clamp 1b should accommodate about 3.2 cm (1.25 inch) circular piping extending there through.

As shown in FIG. 7 and FIG. 8 clamps serving same purpose as clamps 1a and 1b. The configuration of clamps 1c and 1d is designed to be mounted on top of round, square or rectangular post. The set screws 10 securing the objects attached and the clamps.

Figure 9:
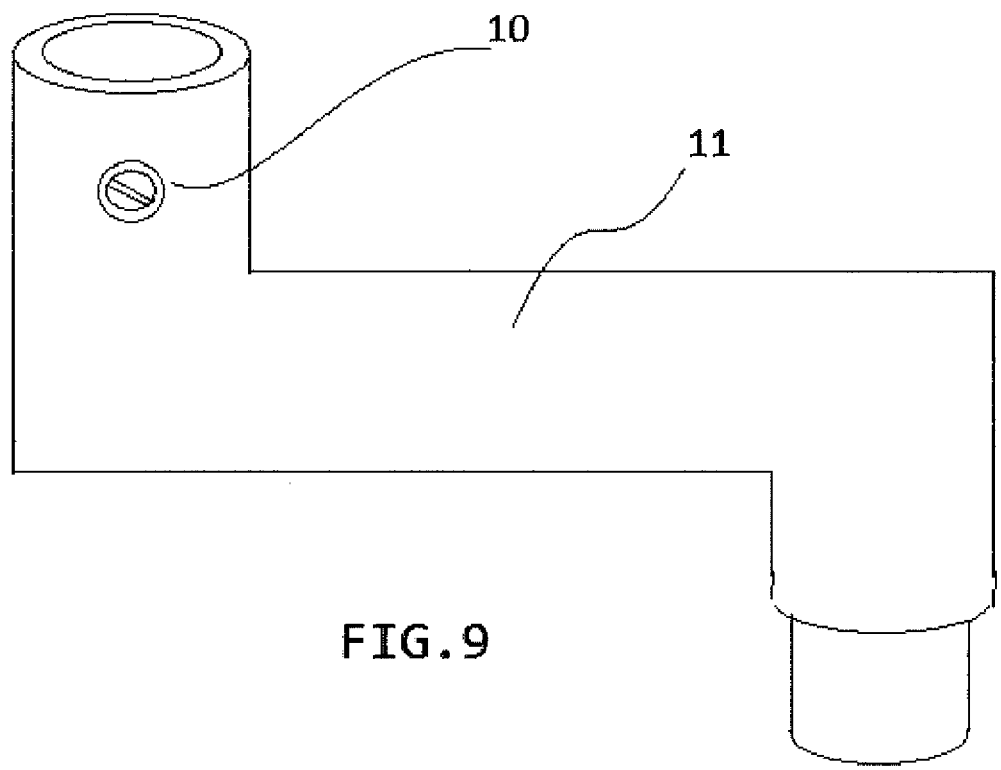
FIG. 9 is an extension offset for mounting on any top of clamp embodiment.

FIG. 9 is showing offset device for horizontal mounted clamps. The offset device is necessary if the solar light is too close to the fence or structure.

Figure 10:
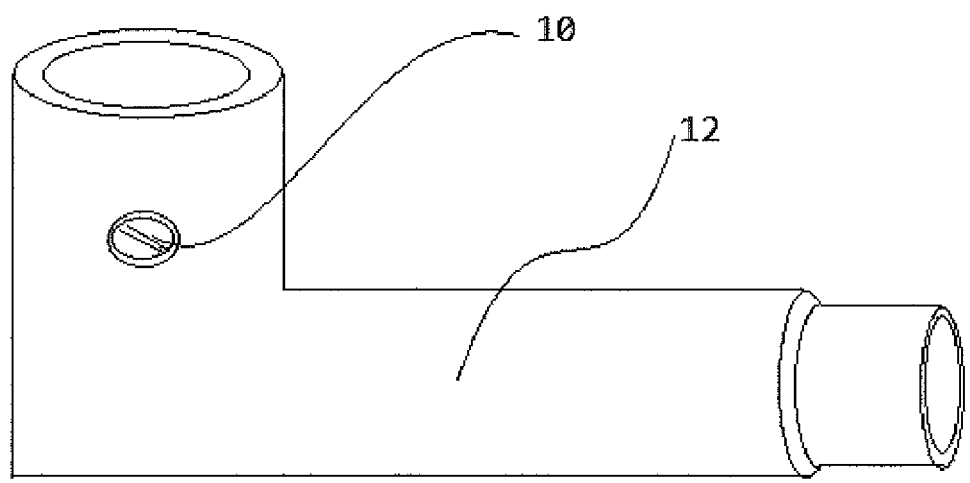
FIG. 10 is an extension offset for mounting on any site or vertically mounted clamp.

FIG. 10 is showing an offset for vertically mounted clamps serving the same purpose as offset shown in FIG. 9.

Figure 11:
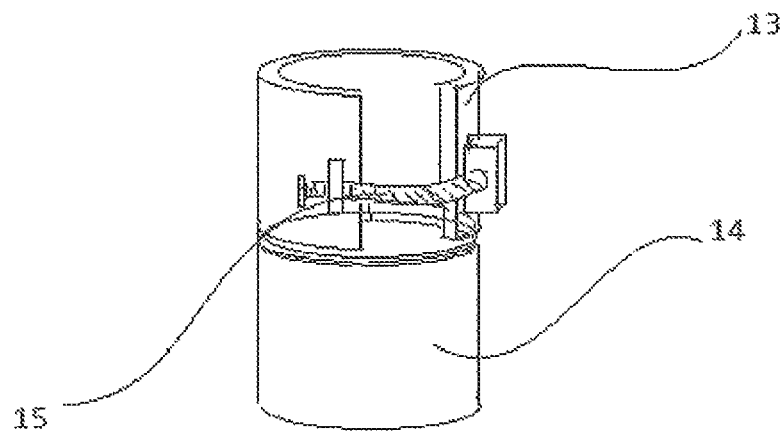
FIG. 11 is an adjustable insert to provide variable sizes of objects to be attached to a clamp.
Figure 12:
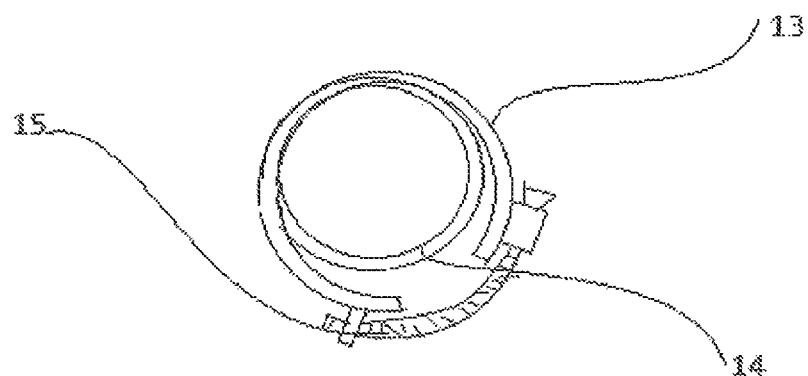
FIG. 12 is top view of an adjustable insert.

FIG. 11 is showing an adjustable clamp sizing device where base 14 is fitting in to attachment mechanism 6 for any shown embodiments of the clamps or offset devices, and upper part 13 equipped with flexible nylon screw 15 to accommodate any variation of solar lights base sizes. FIG. 12 is providing the top view of the adjustable clamp.

The hinges 5 may also have spring-like or expandable qualities. This would allow the clamps to securely adhere to items that may be slightly larger than the clamps design. Additionally, if a fence 9 structure is crooked, one hinge 5 may be able to provide for this deformity without compromising the adherence of the clamps as a whole. Thus, the hinge 5 should provide for vertical movement between the upper half 2 and the lower half 3 as well as lateral movement from one hinge 5 relative to the other hinge 5.

The attachment mechanism 6 is a simple tab and screw 10. The screw 10 can be tightened to tighten the clamps or loosened to loose the clamps. Additionally, the locking mechanism 4 can take number of forms including latches, locks, slid-able mechanisms, and the like. The use of screw 7 or progressive tightening mechanism give more flexibility when securing the clamps to a desired objects.

The current invention, in general, is drawn to a clamps 1a,b,c,d that can support a variety of objects. However, it is preferred and specifically shown in FIGS. 5 and 6 that the present invention is to form part of a lightning system. The clamps and the attachment mechanism 6 are designed to allow individuals to easily light their yard with lights, in particular solar lights 8. The solar light 8 may be removable or it may be a permanent part of the inventive structure. In the case it is removable, the adjustable clamp 13 can be fit with in the attachment mechanism 6. Generally, the attachment mechanism 6 is designed to have an inner diameter of about 1.9 cm (0.75 inches) and be about 1.9 cm (0.75 inch) in height. This sizing provides ample support for the solar light 8 structure. Additionally, a standard chain link fence typically has piping that is about 3.2 cm (1.25 inch) in diameter. A colonial style fence has square rails that are about 2.5 cm (1 inch) in diameter. Thus, the clamps 1a,b,c, and d can be sized to those configurations to provide a clamped lighting system.

PARTS LIST

1a—clamp body square
1b—clamp body round
1c—clamp round top mount
1d—clamp square top mount
2—upper half of clamp
3—lower half of clamp
4—securing mechanism
5—hinge
6—attachment mechanism
7—fastening screw
8—solar light
9—fence
10—set screw
11—offset top mount
12—offset side mount
13—adjustable clamp—top
14—adjustable clamp—bottom
15—nylon screw

The invention claimed is:

1. A clamp system capable of securing a solar lamp to various forms of circular frame fences, the clamp system comprising:
   a clamp body having an upper half and a lower half, each half having a similar semi-circular shape between which is defined a shape to accommodate a circular object extending therethrough;
   at least one hinge joining the upper half and the lower half;
   a locking mechanism having a screw to secure the clamp to a fence; and
   an attachment mechanism affixed to the upper half, the attachment mechanism having a height and a perimeter with an open interior to accommodate a solar light fixture stem secured with a second set screw; and
further comprising an adjustable clamp sizing device to receive various sized solar light fixture stems, the sizing device comprising a base shaped to fit the attachment mechanism interior, and an upper arcuate member that is open, the arcuate member having two ends, each end having an attachment point for a fastener, the fastener being a screw, the screw connecting the attachment points, and when tightened, the screw drawing the attachment points together to close the arcuate member.

2. The clamp system as described in claim 1, further comprising an offset device to position the solar light fixture away from being on top of the fence.

3. The clamp system as described in claim 2, wherein the offset device comprises a longitudinal body and two ends, a first end sized to fit within the attachment mechanism interior, and a second end sized to receive the solar light fixture stem.

4. The clamp system as described in claim 2, wherein the offset device comprises a longitudinal body and a second end, the second end sized to receive an adjustable clamp sizing device.

5. The clamp system as described in claim 3, wherein the two ends are disposed in opposite directions from each other in a Z-like manner.

6. The clamp system as described in claim 3, wherein the offset second end includes an opening therethrough, and a set screw disposed in the opening.

7. The clamp system as described in claim 4, wherein the clamp sizing device is positioned in the offset second end and the clamp sizing device is secured with the set screw.

8. The clamp system as described in claim 7, wherein the clamp sizing device receives the solar light fixture stem.

9. The clamp system as described in claim 2, wherein the clamp sizing device comprises a flexible plastic.

10. The clamp system as described in claim 2, wherein the clamp and the offset device each comprise one or more of a material selected from the group consisting of a plastic, a metal, a resin, or a composite material.

* * * * *